(12) United States Patent
Sturm

(10) Patent No.: US 11,788,307 B2
(45) Date of Patent: Oct. 17, 2023

(54) METHOD FOR DISPLACING A CEILING FORMWORK, COLLISION PROTECTION ELEMENT, AND CEILING FORMWORK, SUPPORTING DEVICE AND INCREMENTAL LAUNCHING DEVICE COMPRISING SUCH A COLLISION PROTECTION ELEMENT

(71) Applicant: Peri GmbH, Weissenhorn (DE)

(72) Inventor: Florian Sturm, Unterroth (DE)

(73) Assignee: PERI SE, Weissenhorn (DE)

( * ) Notice: Subject to any disclaimer, the term of this patent is extended or adjusted under 35 U.S.C. 154(b) by 261 days.

(21) Appl. No.: 16/979,474

(22) PCT Filed: Mar. 6, 2019

(86) PCT No.: PCT/DE2019/100202
§ 371 (c)(1),
(2) Date: Sep. 9, 2020

(87) PCT Pub. No.: WO2019/170197
PCT Pub. Date: Sep. 12, 2019

(65) Prior Publication Data
US 2021/0040751 A1 Feb. 11, 2021

(30) Foreign Application Priority Data
Mar. 9, 2018 (DE) ...................... 10 2018 203 612.8

(51) Int. Cl.
*F16M 11/00* (2006.01)
*E04G 25/04* (2006.01)
(Continued)

(52) U.S. Cl.
CPC ........... *E04G 25/04* (2013.01); *E01D 19/125* (2013.01); *E01D 21/065* (2013.01); *E04B 1/003* (2013.01);
(Continued)

(58) Field of Classification Search
CPC . E01D 19/125; E01D 21/065; E01D 2101/24; E04B 1/003; E04G 11/48;
(Continued)

(56) References Cited

U.S. PATENT DOCUMENTS 3,797,793 A * 3/1974 Moritz .................... E04G 17/16
248/295.11
3,815,858 A 6/1974 Mocny
(Continued)

FOREIGN PATENT DOCUMENTS

AT 327503 B 2/1976
DE 3527470 2/1987
(Continued)

*Primary Examiner* — Amy J. Sterling
(74) *Attorney, Agent, or Firm* — SLEMAN & LUND LLP

(57) ABSTRACT

A method for displacing a ceiling formwork for a nearest concreting section, wherein first and second supporting devices for supporting the ceiling formwork are arranged below the nearest concreting section. Said supporting devices each have a shuttering position and a stripping position, wherein the ceiling formwork is raised to a concreting level in the shuttering position and lowered relative to the concreting level in the stripping position. The first supporting device is moved into the stripping position and the second supporting device is moved into the shuttering position, and a collision protection element is arranged between the second supporting device and an end face of the ceiling formwork when the end face of the ceiling formwork strikes the second supporting device after passing over the first supporting device, so the collision protection element forms a flank rising in the displacement direction for guiding the ceiling formwork in the displacement direction.

19 Claims, 3 Drawing Sheets

(51) Int. Cl.
  *E01D 21/06* (2006.01)
  *E04G 11/48* (2006.01)
  *E04G 17/16* (2006.01)
  *E04G 11/50* (2006.01)
  *E01D 19/12* (2006.01)
  *E04B 1/00* (2006.01)
  *F16M 13/02* (2006.01)
  *E01D 101/24* (2006.01)
  *E04G 11/38* (2006.01)
  *E04G 25/00* (2006.01)

(52) U.S. Cl.
  CPC ............ *E04G 11/48* (2013.01); *E04G 11/483* (2013.01); *E04G 11/486* (2013.01); *E04G 11/50* (2013.01); *E04G 17/16* (2013.01); *F16M 13/022* (2013.01); *E01D 2101/24* (2013.01); *E04G 11/38* (2013.01); *E04G 2025/003* (2013.01); *E04G 2025/006* (2013.01); *E04G 2025/045* (2013.01); *F16M 2200/021* (2013.01); *F16M 2200/025* (2013.01)

(58) Field of Classification Search
  CPC ..... E04G 11/483; E04G 11/486; E04G 11/50; E04G 17/16; E04G 11/38; E04G 2025/003; E04G 2025/006; E04G 2025/045; F16M 13/022; F16M 2200/021; F16M 2200/025
  See application file for complete search history.

(56) References Cited

U.S. PATENT DOCUMENTS

| | | | |
|---|---|---|---|
| 6,347,489 B1 * | 2/2002 | Marshall, Jr. | ........... E02D 27/00 52/126.6 |
| 9,027,898 B1 * | 5/2015 | Holmboe | ............. E04G 25/065 248/354.4 |
| 2021/0301483 A1 * | 9/2021 | Stancescu | ............... E01D 21/00 |
| 2021/0332537 A1 * | 10/2021 | Polom | .................. E01D 19/048 |

FOREIGN PATENT DOCUMENTS

| | | |
|---|---|---|
| DE | 3874172 T2 | 3/1993 |
| DE | 102007023083 | 6/2008 |
| DE | 202012009619 U1 | 11/2012 |
| DE | 102015223762 A1 | 6/2017 |
| GB | 921364 A | 3/1963 |
| KR | 20070001483 | 1/2007 |

* cited by examiner

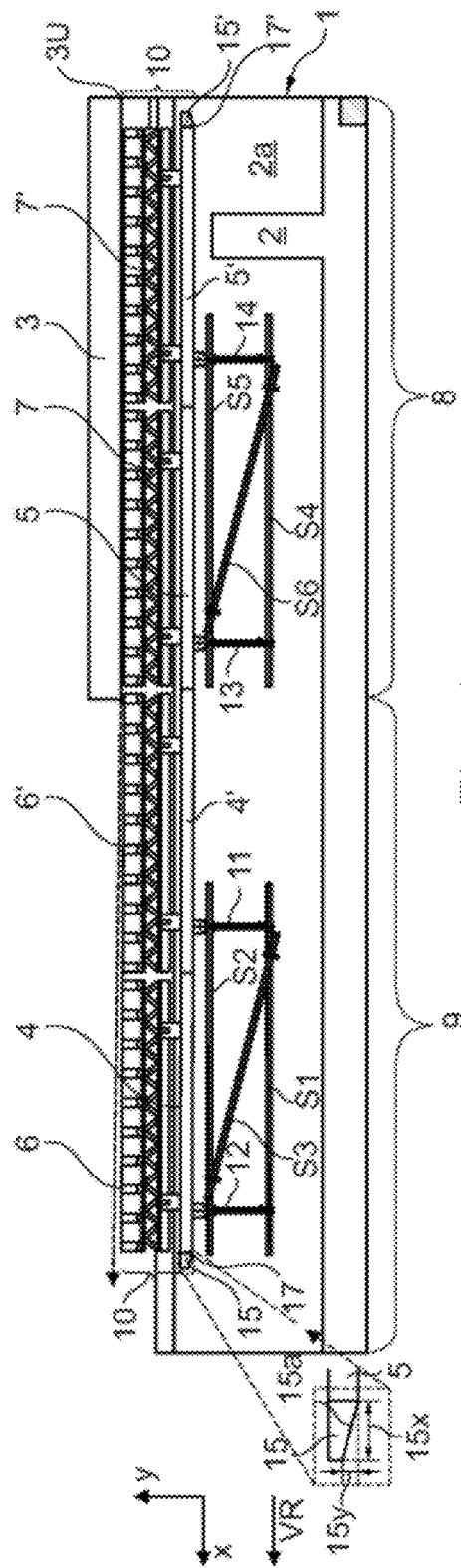
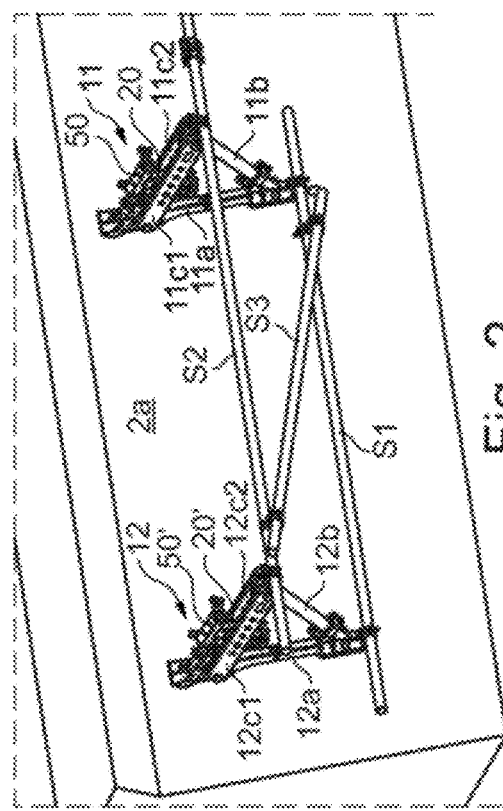
Fig. 1
Fig. 2

METHOD FOR DISPLACING A CEILING FORMWORK, COLLISION PROTECTION ELEMENT, AND CEILING FORMWORK, SUPPORTING DEVICE AND INCREMENTAL LAUNCHING DEVICE COMPRISING SUCH A COLLISION PROTECTION ELEMENT

FIELD OF THE INVENTION

The invention relates to a method for shifting a ceiling formwork into a next concreting cycle comprising a next concreting portion to be concreted, in which first and second support apparatuses for supporting the ceiling formwork, which are arranged next to one another in a shifting direction, are arranged beneath the next concreting portion. The invention further relates to an anti-collision element for preventing a collision of an end face of a ceiling formwork, and to a ceiling formwork, support apparatus and incremental launching apparatus comprising an anti-collision element of this kind.

BACKGROUND OF THE INVENTION

In incremental launching methods, as used for example in bridge construction, among other things a ceiling formwork is pulled or shifted from a previous concreting cycle into a next concreting cycle. To do so, a ceiling formwork in place is dismantled, i.e. lowered from a concreting level required for the concreting, pulled or shifted horizontally into the next concreting cycle, and then pushed or lifted up to the necessary concreting level and installed. Lifting and installing the ceiling formwork is also referred to as shuttering and, as is known, is carried out using rack-and-pinion jacks and/or construction struts and/or spindle apparatuses in order to reach and remain at the concreting level. Specifically in the edge region of a bridge trough, however, the accessibility for a height adjustment is poor due to sloping walls, meaning that shuttering is labor-intensive and time-consuming for workers on the construction site and therefore cost-intensive for the client or developer.

SUMMARY OF THE INVENTION

On that basis, the object of the present invention is to provide a method for shifting a ceiling formwork, by which the lifting and installing of the ceiling formwork is simplified and sped up while avoiding the above-described drawback of the prior art. In addition, the method is aimed at reducing any potential for error during shuttering without increasing a number of tools required, such as rack-and-pinion jacks.

According to the invention, this object is achieved by a method for shifting a ceiling formwork into a next concreting cycle, an anti-collision element, a ceiling formwork and an incremental launching apparatus.

The object of the invention is thus achieved by a method for shifting a ceiling formwork into a next concreting cycle comprising a next concreting portion to be concreted, in which first and second support apparatuses for supporting the ceiling formwork, which are arranged in a shifting direction, in particular on a side wall, for example of an edge region of a bridge trough, and each have a shuttering position and a dismantling position as the working positions, are arranged beneath the next concreting portion, wherein, when the ceiling formwork is being supported by the support apparatus in the shuttering position, the ceiling formwork is lifted up to a concreting level, and when the ceiling forming is being supported by the support apparatus in the dismantling position, the ceiling formwork is lowered relative to the concreting level. The first support apparatus is placed or moved into the dismantling position and the second support apparatus, which is arranged with respect to the first support apparatus in the direction of the shifting direction, is placed or moved into the shuttering position. Next, an anti-collision element is arranged between the second support apparatus and an end face of the ceiling formwork when the end face of the ceiling formwork strikes the second support apparatus after passing over the first support apparatus, such that the anti-collision element forms a flank, which rises in the shifting direction, for guiding the ceiling formwork in the shifting direction, and the end face of the ceiling formwork is lifted, in a manner guided by the anti-collision element, up to the concreting level such that the ceiling formwork passes over the second support apparatus.

According to the invention, therefore, at least two support apparatuses are arranged beneath the next concreting portion to be concreted in the next concreting cycle in the shifting direction, the first support apparatus being in the dismantling position and the second support apparatus, which is arranged directly or indirectly next to the first support apparatus in the shifting direction, being in the shuttering position before the ceiling formwork has passed over the second support apparatus. The first and second support apparatuses can be arranged adjacent to one another, or at least one other support apparatus can be arranged between the first and second support apparatuses, the other support apparatus being placed in the dismantling position or in a position between the dismantling position and the shuttering position (EP). One or more other support apparatuses can thus be arranged between the first and second support apparatuses. In addition, the one or more other support apparatuses can each be placed in the dismantling position. The one or more other support apparatuses can also be placed in a position, offset at the same height, between the dismantling position and the shuttering position. The anti-collision element is then arranged between the support apparatus, which is arranged adjacently to the first support apparatus in the shifting direction, and an end face of the ceiling formwork when the end face of the ceiling formwork strikes after having passed over the first support apparatus. The anti-collision element is additionally arranged between the second support apparatus and an end face of the ceiling formwork when the end face of the ceiling formwork strikes after having passed over the other support apparatus adjacent to the second support apparatus in the opposite direction to the shifting direction.

A ramp rising in the shifting direction and consisting of a plurality of other support apparatuses having positions between the dismantling position and the shuttering position at different heights is also possible, although in this case the anti-collision element is arranged between each other support apparatus and an end face of the ceiling formwork when the end face of the ceiling formwork strikes after having passed over the other support apparatus arranged adjacent to said other support apparatus in the opposite direction to the shifting direction. In this case, the anti-collision element can be arranged on the end face of the ceiling formwork and/or on each of the support apparatuses, in each case in and/or counter to the shifting direction. The flank rising in the shifting direction covers a height difference, which corresponds at least to the height difference that occurs between adjacent support apparatuses due to different positions. If the flank rising in the shifting direction covers a height difference that corresponds at least to a height difference between the dismantling position and the shuttering position, the anti-collision element can be used between adjacent support apparatuses for each height difference.

The support apparatus can assume the shuttering position and the dismantling position by means of a lowering device arranged on a girder element of the support apparatus as a part of the support apparatus designed to vertically shift the ceiling formwork relative to the support apparatus without a lowering device. Alternatively or additionally, each of these positions can be assumed by adjusting a variable length of a girder element, for example in the form of a telescoping device, a spindle or a lifting apparatus, of the support apparatus, said girder element being oriented at least partly vertically when in the supporting state.

If further support apparatuses in the previous concreting cycle are in the dismantling position in order to be able to shift the ceiling formwork into the next concreting cycle, the end face of the ceiling formwork in the shifting direction, which has passed over the first support apparatus in the dismantling position, would collide with the second support apparatus since this support apparatus is in the shuttering position and is lifted up to the concreting level, unlike the other support apparatuses, which are lowered relative to the concreting level. This collision with the second support apparatus is prevented by placing an anti-collision element between the second support apparatus and the end face of the ceiling formwork at the time the end face of the ceiling formwork strikes the second support apparatus, in that the anti-collision element forms a flank, which rises in the shifting direction, for guiding the ceiling formwork in the shifting direction, which allows the end face of the ceiling formwork to be lifted up to the concreting level by the anti-collision element. The end face of the ceiling formwork thus upwardly swerves the second support apparatus and therefore passes over the second support apparatus. The support apparatuses can be placed in the shuttering and dismantling positions, as the working positions, manually and/or by applying electrical, pneumatic and/or hydraulic force.

The end face of the ceiling formwork colliding with the second support apparatus when the ceiling formwork is shifted is thus consciously taken into account, and collision with the second support apparatus such that the end face of the ceiling formwork is stopped by the second support apparatus is prevented by arranging, upon collision, the anti-collision element having the flank rising in the shifting direction. Instead, due to the guidance by the anti-collision element, the ceiling formwork is lifted up upon collision and the end face of the ceiling formwork is lifted up to the concreting level such that the ceiling formwork passes over the second support apparatus. This method thus makes it possible to lift at least one part of the ceiling formwork having the end face in the shifting direction up to the concreting level even before the ceiling formwork has been completely shifted into the next concreting cycle. Instead of not lifting the ceiling formwork to the necessary concreting level and installing it, i.e. shuttering it, until after the completion of a horizontal shift into the next concreting cycle, i.e. a complete shift of the ceiling formwork beneath the next concreting portion to be concreted, the shuttering is begun immediately upon the horizontal shift. Compared with the known dismantling and shuttering, this process speeds up the construction workflow and reduces any potential for error since, unlike in the prior art, a construction worker need not take any additional action in the final method step when the end face of the ceiling formwork is being lifted up to the concreting level.

Instead, the lifting up to the concreting level as a result of the second support apparatus passing over is implemented by means of the anti-collision element. The horizontal movement of the ceiling formwork in the shifting direction is thus partly converted, by the anti-collision element, into a vertical movement for lifting up to the concreting level when the ceiling formwork collides with the second support apparatus. This saves time and, at least in part, saves on lifting and installing of the ceiling formwork that would otherwise have to be carried out separately after the horizontal movement. Since only the support apparatuses that are present anyway can be used, no additional tools, such as rack-and-pinion jacks or lifting jacks, are required either. As a result of the combination according to the invention of the second support apparatus already in the shuttering position before the shuttering, with the anti-collision element and the end face of the ceiling formwork at the time the ceiling formwork collides with the second support apparatus, the shuttering of the ceiling formwork can be simplified and sped up.

The ceiling formwork may be a known ceiling formwork in which the anti-collision element is secured, for example, to the end face in the shifting direction. Alternatively or additionally, the anti-collision element can also be attached at one end to the second support apparatus or any further support apparatuses. Retrofitting existing ceiling formworks and/or support apparatuses with the anti-collision element to carry out the method according to the invention for shifting the ceiling formwork is therefore also possible without difficulty.

Advantageously, by shifting the ceiling formwork into the next concreting cycle, the ceiling formwork is lifted up to the concreting level at least in part such that not only is the end face in the shifting direction located at the concreting level, but so too is a relatively large part of the ceiling formwork. This reduces the work required for shuttering the rest of the ceiling formwork that is not (yet) at the concreting level but rather is below it.

If, once the ceiling formwork has been completely shifted into the next concreting cycle, the first support apparatus is placed in the shuttering position, the entire ceiling formwork can be lifted up to the concreting level. If not only the first and second support apparatuses are supporting the ceiling formwork beneath the next concreting portion, but further support apparatuses are supporting the ceiling formwork, these further support apparatuses can also be placed or held in the shuttering position.

The advantages of the method according to the invention are particularly applicable if the ceiling formwork is shifted from a first concreting cycle, comprising an at least partly concreted first concreting portion, into the next concreting cycle, wherein the next concreting portion is arranged adjacently to the first concreting portion in the shifting direction, a third support apparatus for supporting the ceiling formwork adjacently to the first support apparatus in the opposite direction to the shifting direction is arranged beneath the first concreting portion, the third support apparatus is placed in the dismantling position, the ceiling formwork is shifted by the ceiling formwork first being supported at least in part by the third support apparatus, the end face of the ceiling formwork then passing over the first support apparatus and then the second support apparatus in the shifting direction, and the ceiling formwork then continuing to be shifted into the next concreting portion until a further end face of the ceiling formwork oriented in the opposite direction to the shifting direction (VR) is released by the third support apparatus or until just a ceiling formwork end portion comprising the further end face of the ceiling formwork is supported by the third support apparatus. The ceiling formwork is thus shifted out of the first concreting portion into the next concreting portion and is already in part lifted up to the concreting level. When the first support apparatus is moved out of the dismantling position and placed in the shuttering position, and any further support apparatuses next to the second support apparatus in the shifting direction are placed in the shuttering position, the next concreting portion can be concreted. When the third support apparatus is supporting only the ceiling formwork end portion comprising the further end face of the ceiling formwork shifted into the next concreting portion, the ceiling formwork can abut an end portion of the underside of the concreted first concreting portion so as to make it possible to concrete the next concreting portion flush with the concreted first concreting portion.

Further support apparatuses can be arranged next to the second support apparatus in the shifting direction and/or next to the first/third support apparatus in the opposite direction to the shifting direction, and before the ceiling formwork is shifted into the next concreting portion, the further support apparatuses arranged next to the second support apparatus in the shifting direction can be placed in the shuttering position and/or the further support apparatuses arranged next to the second support apparatus in the opposite direction to the shifting direction can be placed in the dismantling position. In this case, with the ceiling formwork shifted into the next concreting portion, the concreting portion can be concreted as soon as the first support apparatus is placed in the shuttering position.

Advantageously, the anti-collision element is formed on the end face of the ceiling formwork in the shifting direction and/or is formed on the further end face of the ceiling formwork in the opposite direction to the shifting direction having a flank that rises in that direction. By way of example, the anti-collision element can be provided on a longitudinal girder of the ceiling formwork, said girder being supported by a roller of a support apparatus. The anti-collision element then forms an end of the longitudinal girder in the shifting direction and/or in the opposite direction to the shifting direction. The anti-collision element can have a width that corresponds to a width of the longitudinal girder.

If a side of the anti-collision element adjoining a bottom edge of the end face and/or of the further end face is arranged substantially flush with the bottom edge of the end face and/or of the further end face, it is ensured that the ceiling formwork slides or rolls on or over the support apparatus.

Alternatively or additionally to attachment to the ceiling formwork, the anti-collision element can be formed on an end, facing the ceiling formwork, of at least one of the support apparatuses. In this case, there is no need to modify the ceiling formwork in any way in order to carry out the method according to the invention.

Advantageously, the anti-collision element is formed as a solid or hollow body in a beak-shaped, cuneiform or skid-shaped manner or in the form of a ramp. This ensures simple and cost-effective manufacture.

In one embodiment of the invention, the ceiling formwork is provided with a form lining element, which shapes an underside of a carriageway slab, and the support apparatus is configured as a carriageway slab truss-out. Using a ceiling formwork of this kind, an underside of a carriageway slab can be shaped effectively.

At one end facing the ceiling formwork, the support apparatus can form a support head, the support head being provided with a roller for abutting a longitudinal girder of the ceiling formwork. The ceiling formwork can then be shifted on the roller in a rolling manner.

Advantageously, the support apparatus is provided with a lowering device comprising a lifting piston, a support base and a locking apparatus, the lifting piston being slidably mounted in the support base and being configured so as to be slidable from the shuttering position into the dismantling position and lockable in the pushed-out working position by means of the locking apparatus, the locking apparatus being provided with a pivot bearing and an eccentric lever, the eccentric lever being rotatably secured in the pivot bearing, and the lifting piston and the support base being supported against one another in the working position (s.o.) by means of the eccentric lever, and the support base and/or the lifting piston form/forms the support head at one end. This lowering device allows for simple and reliable lifting up to the concreting level and lowering relative to the concreting level such that the support apparatus reaches and remains at the shuttering and dismantling position.

The invention also covers an anti-collision element for preventing a collision of an end face of a ceiling formwork, the ceiling formwork being supported by a first support apparatus placed in a dismantling position, and on a second support apparatus placed in a shuttering position when the ceiling formwork is shifted into a next concreting cycle comprising a next concreting portion to be concreted, the second support apparatus being arranged with respect to the first support apparatus in the direction of a shifting direction of the ceiling formwork, wherein, when the ceiling formwork is being supported by the support apparatus in the shuttering position, the ceiling formwork is lifted up to a concreting level, and when the ceiling formwork is being supported by the support apparatus in the dismantling position, the ceiling formwork is lowered relative to the concreting level, the anti-collision element being arranged between the second support apparatus and an end face of the ceiling formwork when the end face of the ceiling formwork strikes the second support apparatus after having passed over the first support apparatus, such that the anti-collision element has a flank for guiding the ceiling formwork in the shifting direction, said flank rising in the shifting direction and being formed, for example, as a solid or hollow body in a beak-shaped, cuneiform, skid-shaped manner or in the form of a ramp, and is designed to guide the end face of the ceiling formwork so as to lift it up to the concreting level such that the ceiling formwork can pass over the second support apparatus. The advantages of this anti-collision element are the same as those already listed in relation to the use of the anti-collision element.

A ceiling formwork in which the anti-collision element is formed on the end face of the ceiling formwork in the shifting direction and/or is formed on a further end face of the ceiling formwork in the opposite direction to the shifting direction having a flank that rises in that direction makes it possible to shift the ceiling formwork in a manner according to the invention, regardless of the form of the support apparatus that can be placed in the shuttering and dismantling positions.

If, in the ceiling formwork, a side of the anti-collision element adjoining a bottom edge of the end face and/or of the further end face is arranged substantially flush with the bottom edge of the end face and/or of the further end face, it is ensured that the ceiling formwork slides or rolls on or over the support apparatus, thereby reducing/minimizing friction during the shifting of the ceiling formwork, which reduces both wear on the moving parts and operating costs.

Alternatively or additionally to arranging the anti-collision element on the ceiling formwork, the anti-collision element according to the invention can be formed on an end, facing the ceiling formwork, of the support apparatus. The ceiling formwork can then, but need not, be altered in order to carry out the method according to the invention for shifting the ceiling formwork.

In one embodiment of the invention, an incremental launching apparatus comprises at least the first and second support apparatuses and the ceiling formwork having the anti-collision element, the ceiling formwork being provided with a form lining element designed for shaping an underside of a carriageway slab, and the support apparatus being configured as a carriageway slab truss-out, the support apparatus comprising a support head at an end facing the ceiling formwork, the support head being provided with a roller for abutting a longitudinal girder of the ceiling formwork. This incremental launching apparatus makes it possible to shift a ceiling formwork, by which the lifting and installing of the ceiling formwork can be simplified and sped up while avoiding the above-described drawback of the prior art.

Advantageously, the incremental launching apparatus is configured such that the support apparatus is provided with a lowering device comprising a lifting piston, a support base and a locking apparatus, the lifting piston being slidably mounted in the support base and being able to be slid from the shuttering position into the dismantling position and locked in the pushed-out working position by means of the locking apparatus, the locking apparatus being provided with a pivot bearing and an eccentric lever, the eccentric lever being rotatably secured in the pivot bearing, and the lifting piston and the support base being supported against one another in the working position by means of the eccentric lever, and the support base and/or the lifting piston forming the support head at one end. This ensures simple and reliable lifting up to the concreting level and lowering relative to the concreting level in order to reach and remain at the shuttering and dismantling positions for the support apparatus.

Further features and advantages of the invention become clear from the following detailed description of an embodiment of the invention and the claims, and on the basis of the figures of the drawings, which show the essential features of the invention. The features shown in the drawings are illustrated such that the special features according to the invention can be made clearly visible. The various features can each be implemented either individually or together in various combinations in variants of the invention.

BRIEF DESCRIPTION OF THE DRAWINGS

Identical reference numerals correspond to identical or corresponding elements in the drawings, in which:

FIG. 1 is a side view of an incremental launching apparatus according to the invention comprising a plurality of support apparatuses, an anti-collision element (shown in an enlarged manner) and a ceiling formwork, which is shifted from a concreted concreting portion of a carriageway slab of a bridge into a concreting portion to be concreted of the carriageway slab;

FIG. 2 is a spatial external view of two of the support apparatuses shown in FIG. 1, which are formed as carriageway slab truss-outs and are each provided with a lowering device, at one end of which a roller is arranged;

FIG. 3b shows the support apparatus comprising the lowering device and formed as a carriageway slab truss-out as shown in FIG. 3a;

DETAILED DESCRIPTION

Figure 3A:
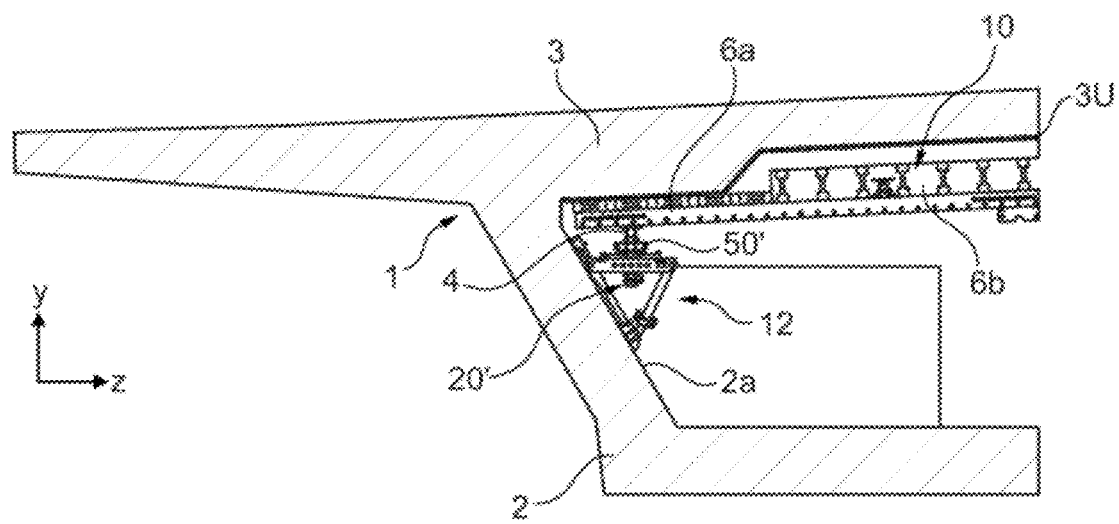
FIG. 3a is a front view of a part of the incremental launching apparatus shown in FIG. 1 comprising a ceiling formwork arranged beneath a carriageway slab and one of the support apparatuses shown in FIG. 2, which is provided with the lowering device and formed as a carriageway slab truss-out.

FIG. 1 shows an incremental launching apparatus according to the present invention, comprising support apparatuses 11-14, an anti-collision element 15 (shown in an enlarged manner) on an end face 17 in a shifting direction VR of a longitudinal girder 4 of the ceiling formwork 10, and the ceiling formwork 10, which is shifted from a first concreted concrete portion 8 in the form of a carriageway slab 3 of a bridge 1 under construction, to a concreting portion 9 to be concreted. The ceiling formwork 10, which is located in the next concreting portion 9 to be concreted, together with form lining elements 6, 6', and in the first concreted concreting portion 8, together with form lining elements 7, 7', is shifted in the X-direction from the first concreting portion 8, in line with a first concreting cycle, into the next concreting portion 9, in line with a next concreting cycle. The concreting portions 8, 9 may be longer than shown in FIG. 1, and may each have a length in the X-direction that corresponds substantially to a length of the ceiling formwork together with the form lining elements 6, 6', 7, 7'. Longer lengths of the concreting portions 8, 9 are also possible.

The lining element 6 is arranged on a framework having a longitudinal girder 4, which is oriented in the X-direction, and on crossbeams, which are each oriented in the Z-direction (perpendicular to the plane of the paper). The form lining element 6' is arranged on a framework having a further longitudinal girder 4' oriented in the X-direction. The additional form lining element 7 of the ceiling formwork 10 is arranged on a framework having a further longitudinal girder 5 oriented in the X-direction, and the further form lining element 7' is arranged on a framework having the further longitudinal girder 5'. The form lining elements 6, 6', 7, 7' are interconnected so as to shape a uniform formwork surface for forming an underside 3U of the carriageway slab 3. The longitudinal girders 4, 4', 5, 5' are thus interconnected at mutually facing ends of the longitudinal girders, an anti-collision element 15 being attached to the end face 17 in the shifting direction VR, which corresponds to the X-direction. In the opposite direction to the shifting direction VR, corresponding to the negative X-direction, a further anti-collision element 15' is arranged on a further end face 17' of the longitudinal girder 5' in the opposite shifting direction VR.

On a sloped side wall 2a of a bridge trough 2 of the bridge 1, a first support apparatus 11, a second support apparatus 12, a third support apparatus 13 and a further support apparatus 14 are arranged adjacently to one another and next to one another in the X-direction. Each of the support apparatuses 11-14 can be placed in a shuttering position EP and a dismantling position AP, the ceiling formwork 10 being lifted up to a concreting level when the ceiling formwork 10 is being supported by each support apparatus 11-14 in the shuttering position EP, and the ceiling formwork being lowered relative to the concreting level when the support apparatuses are in the dismantling position. The first and second support apparatuses 11, 12 are interconnected by longitudinal braces S1, S2 in the X-direction and at different heights in the Y-direction, the longitudinal braces S1, S2 being interconnected by a cross-brace S3 in order to increase the rigidity of the connection between the first and second support apparatuses 11, 12. The third support apparatus 13 and the further support apparatus 14 are interconnected by means of two further longitudinal braces S4, S5 oriented in the X-direction and arranged at different heights in the Y-direction. To increase the rigidity of the connection between the third support apparatus 13 and the further support apparatus 14, the longitudinal braces S4, S5 are interconnected by a further cross-brace, S6.

The ceiling formwork 10 is supported by the support apparatuses 11-14 and can be shifted relative to the support apparatuses 11-14 in the shifting direction VR and in the opposite direction to that direction, each of the longitudinal girders 4, 4', 5, 5' being able to slide or roll on each of the support apparatuses 11-14. For this purpose, an upper end of each of the support apparatuses 11-14 that faces the ceiling formwork 10 during supporting is in contact with an underside of the ceiling formwork 10, which is formed by undersides of the longitudinal girders 4, 4', 5, 5'. In the next concreting portion 9, the first and second support apparatuses 11, 12 are arranged adjacently to one another in the shifting direction VR, the first support apparatus 11 being placed in the dismantling position AP and the second support apparatus 12, which is arranged next to the first support apparatus 11 in the shifting direction VR, being placed in the shuttering position EP. In FIG. 1, the ceiling formwork 10 is shifted from the first concreting portion 8 into the next concreting portions 9, the longitudinal girders 4, 4' having already left the first concreting portion and being located in the next concreting portion 9. At an earlier time (not shown), the entire ceiling formwork 10 was arranged beneath the concreted first concreting portion 8, the first support apparatus 11, the third support apparatus 13 and the further support apparatus 14 having been placed in the dismantling position AP in order to lower the ceiling formwork 10 from the underside 3U of the carriageway slab 3 and shift it in the shifting direction VR.

When the ceiling formwork 10 is shifted in the shifting direction VR into the next concreting portion 9, and once it has passed over the first support apparatus 11, the end face 17 of the ceiling formwork would collide with the end of the second support apparatus facing the ceiling formwork 10, since the second support apparatus 12 is in the shuttering position, and thus at the concreting level, and the other support apparatuses 11, 13, 14 are lowered with respect to the concreting level because each of these support apparatuses 11, 13, 14 is in the dismantling position AP. According to the invention, the anti-collision element 15 is arranged between the second support apparatus 12 and the end face 17 of the ceiling formwork 10 when the end face 17 of the ceiling formwork 10 strikes the second support apparatus 12 after passing over the first support apparatus 11, such that the anti-collision element 15 forms a flank 15a, which rises in the shifting direction VR, for guiding the ceiling formwork 10 in the shifting direction VR. At the time the end face 17 strikes the end of the second support apparatus 12 facing the ceiling formwork 10, the anti-collision element 15 is thus arranged between the second support apparatus 12 and the end face 17 such that the anti-collision element 15 forms a flank 15a, which rises in the shifting direction VR, for guiding the ceiling formwork 10 in the shifting direction VR. Once the end face 17 has struck the second support apparatus 12, the anti-collision element 15 lifts the end face 17 of the ceiling formwork 10 up to the concreting level such that the ceiling formwork 10 passes over the second support apparatus 12. This state, in which the ceiling formwork has passed over the second support apparatus 12, is shown in FIG. 1. After having passed over the second support apparatus 12, the ceiling formwork 10 is tilted in the form of a ramp in the shifting direction upwards in the Y-direction, as indicated by the dashed arrow in FIG. 1. The pitch of the arrow is drawn in exaggerated form.

This is because, due to the dimensions of the ceiling formwork 10, which are significantly larger than the distance between the dismantling position AP and the shuttering position EP in the Y-direction, it is difficult to see in FIG. 1 that the second support apparatus 12 has been placed in the shuttering position at the concreting level and the upper ends of the other support apparatuses 11, 13, 14 are at a lower level relative to the concreting level due to the completed shifting into the dismantling position. This also illustrates the shaping of the flank 15a of the anti-collision element 15, which flank rises in the shifting direction VR and at which a vertical portion 15Y is surmounted when the anti-collision element strikes the second support apparatus 12 if a longitudinal portion 15X of the rising flank 15a (said portion corresponding to a length of the anti-collision element in the X-direction) covers/passes over the second support apparatus 12. The vertical portion 15Y is at least a distance or vertical distance between the shuttering position and the dismantling position in the Y-direction and may be just a few centimeters, e.g. 5 cm. As shown in FIG. 1, the anti-collision element 15 can be beak-shaped. It is also possible, for example, for it to be formed as a solid or hollow body in a cuneiform or skid-shaped manner or in the form of a ramp. A width of the anti-collision element 5 in the Z-direction (out of the plane of the page) can correspond to a width of the longitudinal girder 4.

In FIG. 2, the support apparatuses 11, 12 shown in FIG. 1 are formed as carriageway slab truss-outs, the first support apparatus 11 being provided with a lowering device 20 and the second support apparatus 12 being provided with a further lowering device 20'. At one end in the Y-direction, or the upper end of the lowering device 50, a roller 50 is arranged for resting on one of the longitudinal girders 4, 4', 5, 5', and at a further end of the lowering device 20' in the Y-direction, or a further upper end, a further roller 50' is arranged for resting on one of the longitudinal girders 4, 4', 5, 5'. The support apparatus 11 comprises a first girder element 11a, which is arranged on and secured to the sloped side wall 2a, oriented in the Y-direction. At an upper end of the first girder element 11a, third girder elements 11c1, 11c2 are secured to the first girder element and oriented in the Z-direction. In approximately the center of the two third girder elements 11c1, 11c2, the lowering device 20 is arranged as a part of the first support apparatus 11. The end of each two third girder elements 11c1, 11c2 in the Z-direction is connected, by means of a second girder element 11b, to a further end of the first girder element 11a in the negative Y-direction. The second girder element 11b is configured as a telescoping device or lifting apparatus, such that a length of the second girder element 11b can be enlarged by extending the telescoping device or a piston of the lifting apparatus. In this way, the first support apparatus 11 can be secured to side walls having different positive or negative side slopes, the roller 50 always being oriented in the Z-direction, i.e. horizontally.

The second support apparatus 12 has a first girder element 12a, which is mounted on the sloped side wall 2a; third girder elements 12c1, 12c2 extend in the Z-direction from an upper end of the first girder element 123a, and the further lowering device 20', which has the further roller 50', is arranged between said third girder elements. One end of each two third girder elements 12c1, 12c2 in the Z-direction is connected, by means of a second girder element 12b in the form of a telescoping device or lifting apparatus, to a further end of the first girder element 12a in the negative Y-direction. The girder elements 11a, 11b, 11c1, 11c2 of the first support apparatus 11 and the girder elements 12a, 12b, 12c1, 12c2 of the second support apparatus 12 each form a triangular arrangement configured, in the present case, as a steel girder structure. The first support apparatus 11 and the second support apparatus 12 are each in the shuttering position EP since the lowering devices 20, 20' are lowered or retracted. To carry out the inventive method for shifting the ceiling formwork 10, the second support apparatus 12 in the next concreting portion 9 is placed in the shuttering position EP before the ceiling formwork 10 strikes the second support apparatus 12 after having passed over the first support apparatus 11.

The cross-brace S3 is connected to the longitudinal braces S1, S2 by means of clamps, the longitudinal brace S1 being attached to the ends of the support apparatuses 11, 12 in the negative Y-direction. The longitudinal brace S2 is attached to the ends of the third girder elements 11c1, 11c2 of the first support apparatus 11 and 12c1, 12c2 of the second support apparatus 12 in the Z-direction. By connecting the two support apparatuses by means of the longitudinal braces S1, S2 and the cross-brace S3, a force acting in the shifting direction VR, which acts on each of the support apparatuses 11, 12 during the shifting, can be transmitted to all the bearing points of the first and second support apparatus 11, 12 on the side wall 2a such that the stability of the two support apparatuses during the shifting of the ceiling formwork is increased compared with a solution not having the longitudinal braces S1, S2 and the cross-brace S3.

FIG. 3a is a front view of a part of the incremental launching apparatus shown in FIG. 1 comprising a ceiling formwork 10 arranged beneath the carriageway slab 3 and the support apparatus 11, which is provided with the lowering device 20 and formed as a carriageway slab truss-out. A first portion 6a of the form lining element 6 and a second portion 6b of the form lining element 6, said second portion being higher in the Y-direction than the first portion 6a, form the underside 3U of the carriageway slab 3 of the first concreting portion 9 of the first concreting cycle. The first support apparatus 11, which comprises the lowering device 20, is in the shuttering position EP, in which the lowering device is extended such that the second support apparatus 12, and thus the ceiling formwork 10, are each at the concreting level at which the ceiling formwork 10 abuts the underside 3U of the carriageway stairs 3 in a flush or planar manner.

The longitudinal girder 4 of the ceiling formwork 10 rests on the roller 50', the roller 50' being oriented in the Z-direction and the ceiling formwork 10 being shiftable on the roller 50' in the X-direction or the negative X-direction. The first support apparatus 11 is attached to the side wall 2a of the bridge trough 2 of the bridge 1 by the first girder element 11a, such that the roller 50' of the lowering device 20' is oriented horizontally, i.e. in the Z-direction. By extending a telescoping device or lifting apparatus in the form of a second girder element 11b, the first support apparatus 11 can also be attached to the opposite side of the side wall 2a, in which case the roller 50 would be oriented horizontally. On its end face 17 in the shifting direction VR, the longitudinal girder 4 has the anti-collision element 15, such that when the ceiling formwork 10 strikes the second support apparatus 12, the anti-collision element 15 lifts the end face 17 of the ceiling formwork 10 up to the concreting level such that the ceiling formwork 10 passes over the second support apparatus 12. For illustrative purposes, FIG. 3a shows the carriageway slab 3 having been already concreted, which is not the case in the method according to the invention since the second support apparatus 12 is placed in the shuttering position EP before the ceiling formwork 10 passes over the second support apparatus in order to reach the shuttering position and thus enable the next concreting portion 9 to be concreted.

Figure 3B:
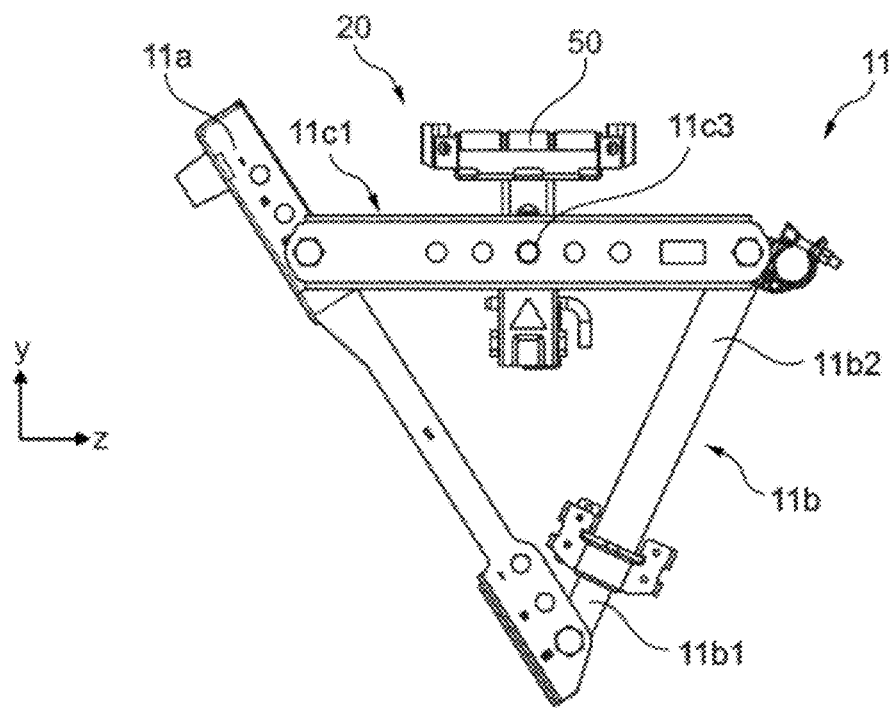

FIG. 3b is a front view, enlarged compared with FIG. 3a, of the support apparatus 11 formed as a carriageway slab truss-out, with the lowering device 20 in the dismantling position AP. The first girder element 11a, the second girder element 11b and the third girder elements 11c1, 11c2 form the triangular steel girder construction, the second girder element 11b being configured in the form of a lifting apparatus comprising a lifting cylinder 11b2 having a lifting piston 11b1 guided therein. In the lowering device 20, a guide pin 11c3 is guided through pin guide holes in the third girder elements 11c1, 11c2 (not shown).

Figure 3C:
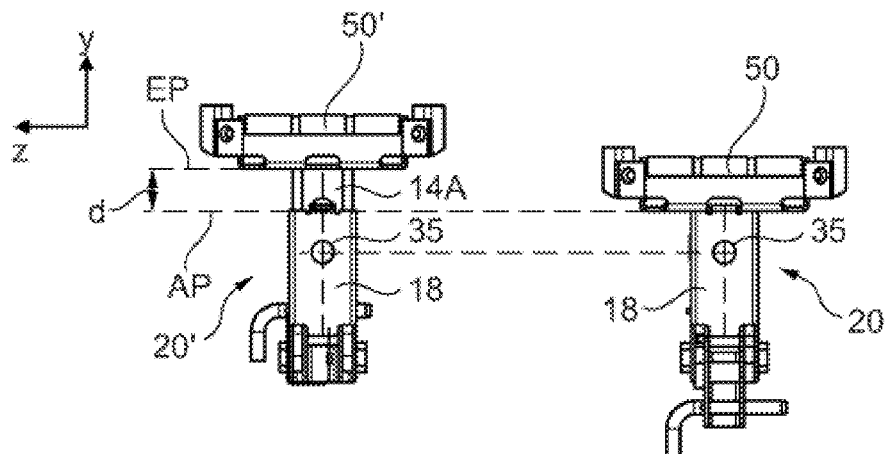
FIG. 3c shows the lowering devices shown in FIG. 2, each comprising one support head lifted up to the concreting level and one support head lowered relative to the concreting level, corresponding to a shuttering position and a dismantling position of the support apparatus provided with the respective lowering device.

FIG. 3c shows the lowering devices 20, 20' shown in FIG. 2, each comprising one support head of the lowering device 20' lifted up to the concreting level and one support head of the lowering device 20 lowered relative to the concreting level, corresponding to the shuttering position EP and the dismantling position AP of the support apparatus 11, 12 provided with the respective lowering device 20, 20'. The lowering device 20 and the further lowering device 20' each have a support base 18, which are arranged at the same height in the Y-direction. This is illustrated by adjustment holes 35 in each of the support bases 18 of the lowering devices 20, 20', by means of a horizontal dashed line interconnecting the two adjustment holes 35. A lifting piston 14A is guided in the support base 18 and is extended in the lowering device 20' such that the lowering device 20' and thus the second support apparatus 12 each reach the shuttering position EP. A stroke length of the lifting piston 14A thus corresponds to a vertical distance or height distance d between the dismantling position AP and the shuttering position EP in the Y-direction. The dismantling position AP is at the height of an upper end of the support base 18, as shown in the lowering device 20. The shuttering position EP is at the height of an upper end of the lifting piston 14A, as shown in the lowering device 20'. The height distance between the shuttering position and the dismantling position can be 50 mm, for example. If the lowering device 20' is moved out of the dismantling position AP and placed in the shuttering position EP, it is not just the upper end of the lifting piston 14a that is raised by the height distance d between the dismantling position AP and the shuttering position EP, but so too is the roller 50' arranged on the lifting piston 14a. By moving the roller 50' out of the dismantling position AP and placing it in the shuttering position EP, the ceiling formwork 10 shiftably resting on the roller 50' can be lifted up to the concreting level.

Figure 4:
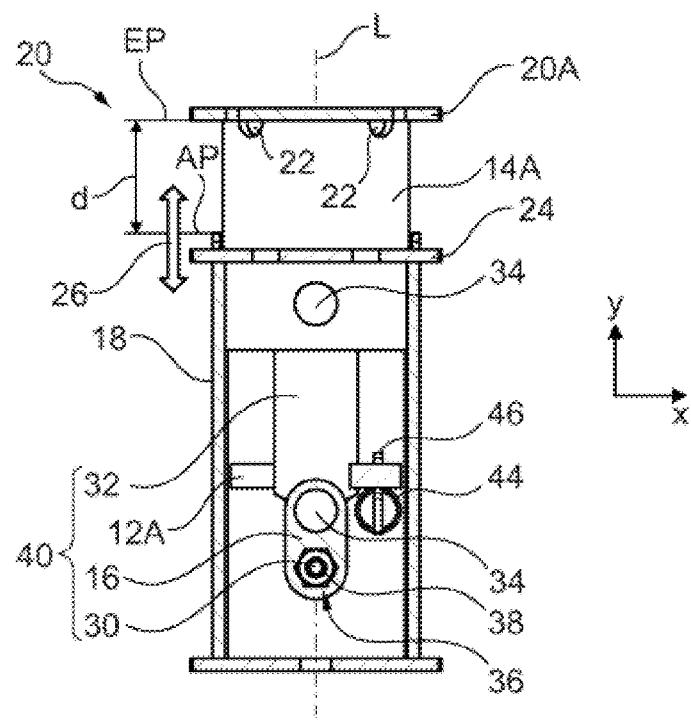
FIG. 4 is a cross-sectional front view of one of the two lowering devices shown in FIG. 3b without a roller, comprising a slide as an eccentric-lever holding apparatus, a lifting piston being shown in the extended shuttering position.

FIG. 4 is a cross-sectional front view of one of the lowering devices 20 shown in FIG. 3b without a roller, comprising a slide 12A as an eccentric-lever holding apparatus, the lifting piston 14A being shown in the extended shuttering position EP. The lowering device 20 has a longitudinal axis (denoted by L), the lifting piston 14A and an eccentric lever 16. As in the lowering device 20' in FIG. 3c, the lifting piston 14A is in the shuttering position EP, which is shifted relative to the dismantling position AP in the Y-direction by the height difference d. The support base 18 can be in the form of a housing that encloses a mechanism of a locking apparatus, e.g. the eccentric lever 16, in a protective manner. At their free ends, both the support base 18 and the lifting piston 14A have a terminal plate, each of which forms a support head 20A. At the end of the support base 18 facing the lifting piston, stop knobs 22 can be arranged between the support base 18 and the support head 20A of the lifting piston 14A. The stop knobs 22 can be welded to an end plate 24 of the support base 18, for example. The end plate 24 has an opening (not shown) that is shaped in accordance with the circumferential shape of the cross section of the lifting piston 14A and through which the lifting piston 14A is pushed. The cross-sectional shape of the lifting piston 14A can, for example, be circular. However, embodiments having a different, in particular polygonal, preferably rectangular, cross-sectional shape can also be used. The direction of the slidable mounting of the lifting piston 14A in the support base 18 is shown symbolically by a double case 26.

The lifting piston 14A can be slid from its pushed-out working position, shown here in the form of the shuttering position EP, into the lowered position shown in FIG. 3c by the lowering device 20, in the form of the dismantling position AP, in a direction that is axial with respect to the longitudinal axis L, and can be locked in the pushed-out working position by means of the locking apparatus, e.g. the eccentric lever 16. FIG. 4 shows a lowering device 20 having a lifting piston 14A arranged in the working position, i.e. the position maximally disengaged from the support base 18 (=forward-stroke position or shuttering position). In other words, the lowering device 20 is in its supporting-function position. The parts of the locking apparatus, e.g. the eccentric lever 16, are positioned accordingly. The eccentric lever 16 rotatably secured in pivot bearings on the support base 18 is movably connected to the lifting piston 14A by means of a con rod element 32. For this purpose, the eccentric lever 16 and the lifting piston 14A each have a hole, which are used as further pivot bearings. In each of its end regions, the con rod element 32 has a pin-like rotary spindle 34. The two rotary spindles 34 are each mounted in one of the further pivot bearings of the eccentric lever 16 and lifting piston 14A.

The center of gravity of the eccentric lever 16 is located outside the rotary spindle (formed by a support shaft 30) of the eccentric lever 16, between the lifting piston 14A and the rotary spindle of the eccentric lever 16.

In FIG. 4, the hub 36 of the rotary spindle of the support shaft 30, and thus of the eccentric lever 16, and a screw nut 38 for the securing thereof, can be seen. The lifting piston 14A, the con rod element 32 and the eccentric lever 16 are arranged similarly to the construction of a reciprocating engine, with the con rod element 32 and the eccentric lever 16 forming a toggle lever 40, by means of which the lifting piston 14A is movably connected to the support base 18. In the working position shown, in the form of the shuttering position, the lifting piston 14A and the support base 18 are supported against one another by means of the eccentric lever 16. In the illustrated embodiment of the lowering device 20, this is done by means of the connection to the con rod element 32.

The eccentric-lever holding apparatus formed by the slide 12A can have a return spring 44 (integrated spring return), the slide 12A being secured to the support base 18 by means of the return spring 44, e.g. via a securing peg 46. In addition, a visible marking for distinguishing between the lowered position in the form of the dismantling position AP and the raised working position in the form of the shuttering position EP can be marked on the slide 12A. This visible marking can, for example, consist of a red and a green visual panel applied to the free end of the long leg of the slide 12A, and depending on the position of the slide 12A either only the red visual panel or both the red and green visual panels come to be located outside the housing.

The features of the invention described with reference to the embodiment shown, such as manually placing the support apparatuses in the shuttering and dismantling positions as the working positions, can also be present in other embodiments of the invention, such as placing the support apparatuses into the shuttering and dismantling positions by applying electrical, pneumatic and/or hydraulic force, unless specified otherwise or prohibited by definition for technical reasons.

The invention claimed is:

1. A method for shifting a ceiling formwork into a next concreting cycle comprising a next concreting portion to be concreted, comprising the steps of:

arranging, beneath the next concreting portion, first and second support apparatuses for supporting the ceiling formwork, which are arranged in a shifting direction, and each have a shuttering position and a dismantling position as the working positions, wherein the ceiling formwork is lifted up to a concreting level when the ceiling formwork is being supported by the support apparatus in the shuttering position, and the ceiling formwork is lowered relative to the concreting level when the ceiling formwork is being supported by the support apparatus in the dismantling position, placing the first support apparatus in the dismantling position and placing the second support apparatus, which is arranged with respect to the first support apparatus in the direction of the shifting direction, in the shuttering position, arranging an anti-collision element between the second support apparatus and an end face of the ceiling formwork when the end face of the ceiling formwork strikes the second support apparatus after passing over the first support apparatus, such that the anti-collision element forms a flank, which rises in the shifting direction, for guiding the ceiling formwork in the shifting direction, and lifting, in a manner guided by the anti-collision element, the end face of the ceiling formwork up to the concreting level such that the ceiling formwork passes over the second support apparatus.

2. The method for shifting a ceiling formwork according to claim 1, wherein the ceiling formwork is lifted up to the concreting level at least in part by the ceiling formwork being shifted into the next concreting cycle.

3. The method for shifting a ceiling formwork according to claim 1, wherein, once the ceiling formwork has been completely shifted into the next concreting cycle, the first support apparatus is placed in the shuttering position in order to lift the ceiling formwork up to the concreting level.

4. The method for shifting a ceiling formwork according to claim 1, wherein the ceiling formwork is shifted from a first concreting cycle, comprising an at least partly concreted first concreting portion, into the next concreting cycle, wherein the next concreting portion is arranged adjacently to the first concreting portion in the shifting direction, wherein
- a third support apparatus for supporting the ceiling formwork is arranged beneath the first concreting portion adjacently to the first support apparatus in the opposite direction to the shifting direction,
- the third support apparatus is placed in the dismantling position,
- the ceiling formwork is shifted by the ceiling formwork first being supported at least in part by the third support apparatus and the end face of the ceiling formwork then passing over the first support apparatus and then the second support apparatus in the shifting direction, and
- the ceiling formwork continues to be shifted into the next concreting portion until a further end face of the ceiling formwork said end face being oriented in the opposite direction to the shifting direction, is released by the third support apparatus, or until just an end portion of the ceiling formwork comprising the further end face of the ceiling formwork is supported by the third support apparatus.

5. The method for shifting a ceiling formwork according to claim 1, wherein
- further support apparatuses are arranged next to the second support apparatus in the shifting direction and/or are arranged next to the first or third support apparatus in the opposite direction to the shifting direction, and
- before the ceiling formwork is shifted into the next concreting portion, the further support apparatuses arranged next to the second support apparatus in the shifting direction are placed in the shuttering position and/or the further support apparatuses arranged next to the second support apparatus in the opposite direction to the shifting direction are placed in the dismantling position.

6. The method for shifting a ceiling formwork according to claim 1, wherein
- the first and second support apparatuses are arranged adjacently to one another, or
- at least one other support apparatus is arranged between the first and second support apparatuses, wherein the other support apparatus is placed in the dismantling position or in a position between the dismantling position and the shuttering position.

7. The method for shifting a ceiling formwork according to claim 1, wherein the anti-collision element is formed on the end face of the ceiling formwork in the shifting direction and/or is formed on a/the further end face of the ceiling formwork in the opposite direction to the shifting direction having a flank that rises in that direction.

8. The method for shifting a ceiling formwork according to claim 7, wherein a side of the anti-collision element adjoining a bottom edge of the end face and/or of the further end face is arranged substantially flush with the bottom edge of the end face and/or of the further end face in order to ensure that the ceiling formwork slides or rolls on or over the support apparatus.

9. The method for shifting a ceiling formwork according to claim 1, wherein the anti-collision element is formed on an end, facing the ceiling formwork, of at least one of the support apparatuses.

10. The method for shifting a ceiling formwork according to claim 1, wherein the anti-collision element is formed as a solid or hollow body in a beak-shaped, cuneiform or skid-shaped manner or in the form of a ramp.

11. The method for shifting a ceiling formwork according to claim 1, wherein the ceiling formwork is provided with a form lining element which shapes an underside of a carriageway slab, and the support apparatuses are configured as carriageway slab truss-outs.

12. The method for shifting a ceiling formwork according to claim 11, wherein, at one end facing the ceiling formwork, the support apparatus forms a support head, wherein the support head is provided with a roller for abutting a longitudinal girder of the ceiling formwork.

13. The method for shifting a ceiling formwork according to claim 12, wherein the support apparatus is provided with a lowering device comprising a lifting piston, a support base and a locking apparatus, wherein the lifting piston is slidably mounted in the support base and is configured so as to be slidable from the shuttering position into the dismantling position and lockable in the pushed-out working position by means of the locking apparatus, wherein the locking apparatus is provided with a pivot bearing and an eccentric lever, wherein the eccentric lever is rotatably secured in the pivot bearing, and the lifting piston and the support base are supported against one another in the working position by means of the eccentric lever, and the support base and/or the lifting piston form/forms the support head at one end.

14. An anti-collision element for preventing a collision of an end face of a ceiling formwork, wherein the ceiling formwork is supported by a first support apparatus placed in a dismantling position and on a second support apparatus placed in a shuttering position when the ceiling formwork is shifted into a next concreting cycle comprising a next concreting portion to be concreted, wherein the second support apparatus is arranged with respect to the first support apparatus in the direction of a shifting direction of the ceiling formwork, wherein the ceiling formwork is lifted up to a concreting level when the ceiling formwork is being supported by the support apparatus in the shuttering position, and, the ceiling formwork is lowered relative to the concreting level when the ceiling formwork is being supported by the support apparatus in the dismantling position, wherein, when the end face of the ceiling formwork strikes the second support apparatus after having passed over the first support apparatus, the anti-collision element is arranged between the second support apparatus and an end face of the ceiling formwork such that the anti-collision element has a flank for guiding the ceiling formwork in the shifting direction, said flank rising in the shifting direction and being formed as a solid or hollow body in a beak-shaped, cuneiform or skid-shaped manner or in the form of a ramp, and is configured to guide the end face of the ceiling formwork so as to lift it up to the concreting level such that the ceiling formwork can pass over the second support apparatus.

15. A ceiling formwork, wherein the anti-collision element according to claim 14 is formed on the end face of the ceiling formwork in the shifting direction and/or is formed on a further end face of the ceiling formwork in the opposite direction to the shifting direction having a flank that rises in that direction.

16. The ceiling formwork according to claim 15, wherein a side of the anti-collision element adjoining a bottom edge of the end face and/or of the further end face is arranged substantially flush with the bottom edge of the end face and/or of the further end face in order to ensure that the ceiling formwork slides or rolls on or over the support apparatus.

17. A support apparatus, wherein the anti-collision element according to claim 14 is formed on an end, facing the ceiling formwork, of the support apparatus.

18. An incremental launching apparatus comprising at least the first and second support apparatuses and the ceiling formwork according to claim 15, wherein the ceiling formwork is provided with a form lining element configured for shaping an underside of a carriageway slab, and the support apparatus is configured as a carriageway slab truss-out, wherein, at an end facing the ceiling formwork, the support apparatus comprises a support head, wherein the support head is provided with a roller for abutting a longitudinal girder of the ceiling formwork.

19. The incremental launching apparatus according to claim 18, wherein the support apparatus is provided with a lowering device comprising a lifting piston, a support base and a locking apparatus, wherein the lifting piston is slidably mounted in the support base and can be slid from the shuttering position into the dismantling position and locked in the pushed-out working position by means of the locking apparatus, wherein the locking apparatus is provided with a pivot bearing and an eccentric lever, wherein the eccentric lever is rotatably secured in the pivot bearing, and the lifting piston and the support base are supported against one another in the working position by means of the eccentric lever, and the support base and/or the lifting piston form/forms the support head at one end.

* * * * *